United States Patent [19]

Neely, Jr.

[11] 4,412,863

[45] Nov. 1, 1983

[54] INORGANIC CEMENT COMPOSITIONS HAVING CONTROLLED THERMAL EXPANSION COEFFICIENTS

[75] Inventor: James E. Neely, Jr., Butler, Pa.

[73] Assignee: PPG Industries, Inc., Pittsburgh, Pa.

[21] Appl. No.: 299,359

[22] Filed: Sep. 4, 1981

[51] Int. Cl.$^3$ .............................................. C04B 19/04
[52] U.S. Cl. ...................................................... 106/84
[58] Field of Search ......................................... 106/84

[56] References Cited

U.S. PATENT DOCUMENTS

| | | | |
|---|---|---|---|
| 2,372,284 | 3/1945 | Marc | 117/126 |
| 2,662,022 | 12/1953 | Dietz | 106/74 |
| 3,178,299 | 4/1965 | Wilborn | 106/84 |
| 3,445,257 | 5/1969 | Hloch et al. | 106/84 |
| 3,454,410 | 7/1969 | Schutt et al. | 106/74 |
| 3,639,276 | 2/1972 | Mueller | 252/62 |
| 3,930,876 | 1/1976 | Nakajima et al. | 106/74 |
| 3,943,231 | 3/1976 | Wasel-Nielen et al. | 423/311 |
| 3,954,482 | 5/1976 | Novack | 106/84 |
| 3,959,063 | 5/1976 | Hawthorne | 106/84 |
| 4,171,984 | 10/1979 | Hosaka et al. | 106/84 |
| 4,216,190 | 8/1980 | Neely, Jr. | 423/314 |

*Primary Examiner*—James Poer
*Attorney, Agent, or Firm*—Donna L. Seidel; Lee Patch

[57] ABSTRACT

An inorganic silicate cement composition has its thermal expansion coefficient controlled for use with different substrates subjected to temperature variations through the inclusion of selected inorganic filler materials. Selected metallic powder filler materials are provided to yield a relatively high thermal expansion coefficient and fused silica powder is provided as a filler material to yield a relatively low thermal expansion coefficient.

16 Claims, No Drawings

INORGANIC CEMENT COMPOSITIONS HAVING CONTROLLED THERMAL EXPANSION COEFFICIENTS

FIELD OF THE INVENTION

The present invention relates generally to the art of inorganic silicate cement compositions.

DISCUSSION OF THE TECHNICAL PROBLEM

It is generally known to prepare cementitious compositions from a mixture of water soluble silicates and an inorganic curing agent. For example, U.S. Pat. No. 2,662,022 to Dietz discloses self-hardening water-glass compositions which include mixtures of sodium silicate and potassium silicate solutions with hardeners from the group consisting of esters, amides, and anhydrides of aliphatic organic acids. Fillers utilized include quartz sand, quartz powder, glass powder, porcelain powder, chamotte powder and stoneware powder, as well as graphite, silicon carbide and silicon.

U.S. Pat. No. 3,178,299 to Wilborn discloses a self hardening water-glass cement comprising an alkali silicate, hardener, and inert fillers. Suggested fillers include crystallographic forms of silicon dioxide, aluminum silicates, silicon carbide, and heavy spar.

U.S. Pat. No. 3,445,257 to Hloch et al. teaches a water-glass cement including condensed aluminum phosphates as hardeners and conventional filler materials.

U.S. Pat. No. 3,639,276 to Mueller discloses a molded thermal insulation material for use with austenitic stainless steel chemical processing equipment, consisting of at least 60 percent cellular expanded perlite bonded by a dried inorganic water soluble binder.

While each of the above discussed cement compositions may be useful, they do not provide a method of matching the thermal expansion coefficient thereof to the thermal expansion coefficient of the substrates to be adhered. Inorganic silicate cement compositions having preselected thermal expansion coefficients are useful when substrates are to be adhered together which thereafter are to be subjected to considerable temperature variations during use. It would be desirable to have a method of controlling the thermal expansion coefficient of inorganic silicate cements, in order to be better able to match the thermal expansion characteristics of the inorganic silicate cement to the substrates to be adhered.

SUMMARY OF THE INVENTION

The present invention provides a method of controlling the thermal expansion coefficients of inorganic silicate cement compositions by the inclusion therein of selected inorganic filler materials which controllably raise or lower the thermal expansion coefficient of the final cement composition according to their relative proportions. The cement compositions of the present invention generally include water-soluble silicates, e.g., sodium and potassium silicate; an inorganic curing agent, e.g., the B-form of aluminum trimetaphosphate; and selected amounts of the desired inorganic filler material. Silicate cement compositions having relatively high thermal expansion coefficients, e.g., greater than about $10 \times 10^{-6\circ}$ C.$^{-1}$, may be provided through the use of metallic powder filler materials, e.g., manganese, stainless steel, or copper. Silicate cement compositions having relatively low thermal expansion coefficients, e.g., less than about $9.5 \times 10^{-6\circ}$ C.$^{-1}$, may be provided through the use of fused silica, i.e., a non-crystalline form of silicon dioxide, as a filler material.

DESCRIPTION OF THE INVENTION

Inorganic silicate cement compositions having controlled thermal expansion coefficients, e.g., in a range between about $4.0 \times 10^{-6\circ}$ C.$^{-1}$ to about $25 \times 10^{-6\circ}$ C.$^{-1}$, may be formulated in accordance with the present invention from the combination of appropriate amounts of (1) water soluble silicates, (2) a curing agent, and (3) selected inorganic filler materials. The selection of particular filler materials and the amount thereof which is incorporated into the final cement composition may be utilized in the practice of the present invention to control the thermal expansion coefficient of the cement composition. In this manner an inorganic silicate cement composition may be produced having a thermal expansion coefficient which is matched to particular substrates which are to be adhered together, e.g., a pair of glass substrates adhered together to form a multiple glazed unit.

Water soluble silicates which may be used in the present invention although not limiting thereto, include alkali silicates such as sodium silicate and potassium silicate, and preferably a mixed alkali silicate will be used to provide a decreased water solubility in the final cement composition, e.g., a combination of sodium silicate ($Na_2O \cdot XSiO_2$) and potassium silicate ($K_2O \cdot XSiO_2$). Potassium silicate utilized in the present invention preferably has an $SiO_2/K_2O$ weight ratio between about 1.9 and about 2.5. Sodium silicate utilized in the present invention preferably has an $SiO_2/Na_2O$ weight ratio between about 3.0 and about 4.0. Where a combination of sodium silicate and potassium silicate is used in cement compositions of the present invention, preferably each will comprise at least about 25 weight percent and less than about 75 weight percent of the total silicate content, and more preferably between 40 and 60 weight percent, although other cations such as lithium or ammonium may be present. Total silicate composition is preferably between about 5% and about 70% of the final dry cement composition by weight.

Curing agents which may be used in the practice of the present invention may include any of the variety of phosphate, borate or zincate curing agents which are known to be useful for hardening silicate compositions, and preferably comprises the B-form of aluminum trimetaphosphate as disclosed in U.S. Pat. No. 4,216,190, which teachings are incorporated herein by reference. Preferably the curing agent comprises between 1% to about 15% of the final dry cement composition by weight.

Inorganic filler materials which may be used in silicate cement compositions of the present invention include inert, partially inert and reactive fillers which serve to alter the thermal expansion coefficient of the final cement composition. According to the present invention, the choice of filler material or materials and the amount thereof may be utilized to control the thermal expansion coefficient of the final dry cement composition, e.g., use of large proportions of a metallic powder filler material such as manganese, stainless steel, copper, tin, zinc, lead, nickel, iron or gold, yields a cement composition having a relatively high thermal expansion coefficient. Likewise, use of large proportions of fused silica filler material yields a cement composition having a relatively low thermal expansion coefficient. Generally, total filler material should comprise between about 20% and about 90% of the final dry cement composition by weight. When metallic powder filler materials are being utilized in the practice of the invention, preferably other filler materials such as talc, mica or quartz are also included to the extent of at least about 5% of the final cured cement composition by weight to improve the strength of the final cement composition.

In a first method of preparing inorganic cement compositions according to the present invention, a dry mixture of an inorganic curing agent; an inorganic filler material or materials, and an alkali silicate, e.g., potassium silicate; is formed. Preferably, each of the dry ingredients are finely particularized, preferably at −80 Mesh (M) or finer, and more preferably at about −325 M.

An aqueous mixture is formed of an alkali silicate, e.g., sodium silicate, and appropriate amounts of water to give the final product a cementitious consistency.

The dry mixture and the aqueous mixture are then combined to form a moist cementitious composition. Preferably, the constituents are included in amounts appropriate to provide a total silicate to curing agent ratio by weight in the range between about 2 to 30, more preferably between about 4 to 7, and most preferably about 6. Generally as the silicate to curing agent ratio increases, the water solubility of the final cement composition also increases.

As an alternative method to the above-discussed preparation technique, an aqueous slurry of the inorganic curing agent may be formed. A separate mixture of an alkali silicate, e.g., the sodium silicate, and water is then prepared and continually stirred, preferably to establish a vortex in its central region. While continually stirring the alkali silicate mixture, the inorganic curing agent aqueous slurry is added into the vortex thereof to quickly disperse it. Thereafter, while continually mixing, the dry alkali silicate, e.g., potassium silicate, and the dry inorganic filler material or materials are added. Relative ingredient weight ratios remain unchanged from those previously discussed.

Whatever the method selected for mixing the constituents of the cement compositions of the present invention, it is desirable to avoid a condition known as "chemical shock," wherein the mixing of an alkali silicate with a strongly acidic curing agent may give rise to the uncontrolled rapid growth of colloidal silica polymers. The possibility of such an undesirable occurrence is diminished by use of the preferred highly pure B-form of aluminum trimetaphosphate as disclosed in U.S. Pat. No. 4,216,190.

In the practice of the present invention, selection of the inorganic filler material to be used and the amounts thereof is dependent upon the application foreseen for the final product. For example, if the final cement is to be used to adhere two substrates of similar thermal expansion characteristics which will be subsequently subjected to considerable temperature variations during use, it is desirable that the final inorganic silicate cement composition, when cured, have a thermal expansion coefficient which is comparable to that of each of the substrates. Alternatively, it may be desired to adhere substrates of considerably different thermal expansion characteristics, in which case the inorganic silicate cement composition may preferably have a thermal expansion coefficient between those of the two substrates, or greater than either substrate. According to the present invention, an inorganic filler material or combinations thereof are utilized to control the thermal expansion coefficient of the final cement composition. Generally, the inclusion of fused silica tends to yield a cement composition having a relatively low value, while the inclusion of a metallic powder filler material, e.g., stainless steel, manganese, tin, lead, zinc, nickel, iron, gold or copper, has the opposite effect. In this manner, silicate cement compositions having thermal expansion coefficients in the range between about $4.0 \times 10^{-6}$ $C.^{-1}$ and about $25 \times 10^{-6}$ $C.^{-1}$ may be selectively provided.

After formulation of a desired cement composition, it is preferred that a controlled drying cycle be utilized to assure a homogenous structure throughout the cement composition, i.e., a non-porous structure or a uniform distribution of small pores therethrough. A too-rapid drying cycle may yield a porous structure which might prove undesirable in certain applications. The final thermal expansion coefficient of a given silicate cement composition may be affected by the drying conditions to which it is subjected. Thus, although not limiting to the invention, a controlled humidity environment may be utilized during the drying cycle of the silicate cement compositions of the present invention. The present invention will be further understood by the description of the Examples which follow.

EXAMPLE I

A first mixture of dry ingredients was formed, including 18.7 grams of B-form aluminum trimetaphosphate, 226 grams of predominantly α-phase manganese powder (particle size −80, +100 M), 22.5 grams of talc, and 72 grams of potassium silicate having a 2.3 weight ratio of $SiO_2/K_2O$.

A second mixture was formed, including 72.6 cubic centimeters of water and 100.8 grams of an aqueous solution of sodium silicate available from Diamond Shamrock Co. as Grade 34, having a 32.5% solids content.

The dry mixture was mixed into the aqueous mixture to form a cement composition having a silicate/phosphate ratio, i.e., a silicate/curing agent ratio, of 5.8 by weight.

A portion of the cement composition was poured into a mold and subjected to a controlled drying cycle as follows:

| Controlled Humidity Environment: | | | | | |
|---|---|---|---|---|---|
| Relative Humidity (%) | 95 | 94 | 71 | 54 | 47 |
| Temperature (°C.) | 28 | 35 | 36 | 40 | 43 |
| Time (Hr.) | 1 sec. | 6 hr. | 18 hr. | 14 hr. | 12 hr. |
| Drying/Curing Cycle | | | | | |
| Temperature (°C.) | 47 | 74 74 | 96 96 | 111 180 | 50 |
| Time (Hr.) | 1 sec. Total | 8 hr. 16 hr. | 8 hr. 16 hr. | 8 hr. 9 hr. | 10 hr. 125 hr. |

Thermal expansion coefficient measurements were conducted on the hardened cement composition of Example I by subjecting a bar of the material having standard dimensions of ¼ inch (0.6 cm.) × ¼ inch (0.6 cm.) × 1 inch (2.5 cm.) at 22° C. to temperature variations in the range between 25° C. and 250° C. Results indicated a thermal expansions coefficient for the composition of $18.4 \times 10^{-6\circ}$ C.$^{-1}$, as measured by an Orton Automatic Recording Dilatometer, Columbus, Ohio.

The cement composition of Example I exhibits a thermal expansion coefficient which is comparable to that of common metals, and accordingly may be advantageously used to adhere two metallic substrates, or alternatively, to adhere a metallic substrate with a thermal expansion coefficient in excess of $18.4 \times 10^{-6\circ}$ C.$^{-1}$ to, for example, a siliceous substrate having a thermal expansion coefficient less than $18.4 \times 10^{-6\circ}$ C.$^{-1}$.

EXAMPLE II

A cement composition was prepared, differing from the composition of Example I only in that 67.5 grams of fused silica (−400 M) were substituted in place of the 226 grams of manganese powder.

A portion of the cement composition was poured into a mold and subjected to a controlled drying cycle as follows:

| Controlled Humidity Environment: | | | | | | | |
|---|---|---|---|---|---|---|---|
| Relative Humidity (%) | | 95 | 94 | 71 | 54 | 47 | |
| Temperature (°C.) | | 28 | 35 | 36 | 40 | 45 | |
| Time (Hr.) | | 1 sec. | 6 hr. | 18 hr. | 14 hr. | 12 hr. | |
| Drying/Curing Cycle | | | | | | | |
| Temperature (°C.) | 30 | 75 | 75 | 102 | 102 | 13 | 180 | 40 |
| Time (Hr.) | 1 sec. | 9 hr. Total | 10 hr. | 8 hr. | 10 hr. | 10 hr. | 8 hr. 121 hrs. | 16 hr. |

A measured thermal expansion coefficient of $8.1 \times 10^{-6\circ}$ C.$^{-1}$ was obtained.

EXAMPLE III

A cement composition was prepared by the method utilized in Example I, having the following constituents:
35 grams of B-form aluminum trimetaphosphate (−400 M);
150 grams of fused silica;
50 grams of talc;
360.8 grams of a potassium silicate aqueous solution marketed under the trademark Kasil 6 available from PQ. Corp. of Philadelphia, Pa.;
215 grams of the aqueous solution of sodium silicate; and
70 cubic centimeters of water.

A cement composition was formed having a silicate/phosphate weight ratio of 6.0.

A portion of the cement composition was poured into a mold and subjected to a controlled drying cycle as follows:

| Controlled Humidity Environment: | | | | | |
|---|---|---|---|---|---|
| Relative Humidity (%) | 66.5 | 50 | 37.5 | 2.6 | 22 |
| Temperature (C.) | 25 | 30 | 35 | 40 | 45 |
| Time (Hr.) | 1 sec | 6 hr. | 6 hr. | 6 hr. | 6 hr. |
| Drying/Curing Cycle | | | | | |
| Temperature (°C.) | 45 | 145 | 145 | | |
| Time (Hr.) | 1 sec Total | 30 hr. | 14.5 hr. | | 68.5 hrs. |

Thermal expansion coefficient measurements were obtained on a hardened sample of the cement composition of Example III, in the manner discussed above, yielding a value of about $7.9 \times 10^{-6\circ}$ C.$^{-1}$. Such a cement composition may be advantageously employed in adhering two siliceous substrates, and may be particularly useful in the construction of multiple-paned glass window units due to the similarity between the thermal expansion coefficients of glass and the subject cement composition.

EXAMPLE IV

A cement composition was prepared by the method discussed in Example I, having the following constituents:
35 grams of B-form aluminum trimetaphosphate (−400 M);
100 grams of fused silica;
100 grams of talc;
360.8 grams of the aqueous solution of potassium silicate;
215 grams of the aqueous solution of sodium silicate; and
70 cubic centimeters of water.

A cement composition was formed having a silicate/phosphate weight ratio of 6.0.

A portion of the cement composition was poured into a mold and subjected to a controlled drying cycle as follows:

| Controlled Humidity Environment: | | | | | |
|---|---|---|---|---|---|
| Relative Humidity (%) | 66.5 | 50 | 37.5 | 28.6 | 22 |
| Temperature (°C.) | 25 | 30 | 35 | 40 | 45 |
| Time (Hr.) | 1 sec | 6 hr. | 6 hr. | 6 hr. | 6 hr. |
| Drying/Curing Cycle: | | | | | | |
| Temperature (°C.) | 48 | 72 | 96 | 117 | 126 | 150 | 81 |
| Time (Hr.) | 1 sec Total | 5 hr. | 5 hr. | 10 hr. | 5 hr. | 5 hr. | 10 hr. 64 hrs. |

Thermal expansion coefficient measurements yielded a value of about $8.8 \times 10^{-6\circ}$ C.$^{-1}$, which corresponds closely to the thermal expansion coefficient of commercial float glasses.

EXAMPLE V

A cement composition was prepared according to the method discussed in Example I, differing from the composition of Example IV only in that 200 grams of talc were utilized instead of 100 grams of talc and 100 grams of fused silica. A portion of the cement composition was poured into a mold and subjected to a controlled drying cycle as follows:

| Controlled Humidity Environment: | | | | | |
| --- | --- | --- | --- | --- | --- |
| Relative Humidity (%) | 66.5 | 50 | 37.5 | 22.6 | 22 |
| Temperature (°C.) | 25 | 30 | 35 | 40 | 45 |
| Time (Hr.) | 1 sec. | 6 hr. | 6 hr. | 6 hr. | 6 hr. |
| Drying/Curing Cycle | | | | | |
| Temperature (°C.) | 45 | 95 | 125 | 150 | 50 |
| Time (Hr.) | 1 sec. Total | 10 hr. | 15 hr. | 5 hr. | 15 hr. 69 hrs. |

A measured thermal expansion coefficient of $9.7 \times 10^{-6}$ °C.$^{-1}$ was obtained. A summary of the results of Examples I-V may be found in Table I below.

TABLE I

| EXAMPLE | SILICATE COMPOSITION | CURING AGENT | FILLER MATERIALS | THERMAL EXPANSION COEFFICIENT ($\times 10^{-6}$ °C.$^{-1}$) |
| --- | --- | --- | --- | --- |
| I | 110.8 gm. Sodium Silicate Solution | 18.7 gm. B-Form Aluminum Trimetaphosphate | 22.5 gm. Talc | 18.4 |
| | 72 gm. Potassium Silicate | | 226 gm. Manganese Powder | |
| II | 110.8 gm. Sodium Silicate Solution | 18.7 gm. B-Form Aluminum Trimetaphosphate | 22.5 gm. Talc | 8.1 |
| | 72 gm. Potassium Silicate | | 67.5 gm. Fused Silica | |
| III | 215 gm. Sodium Silicate Solution | 35 gm. B-Form Aluminum Trimetaphosphate | 150 gm. Fused Silica | 7.9 |
| | 360.8 gm. Potassium Silicate Solution | | 50 gm. Talc | |
| IV | 215 gm. Sodium Silicate Solution | 35 gm. B-Form Aluminum Trimetaphosphate | 100 gm. Fused Silica | 8.8 |
| | 360.8 gm. Potassium Silicate Solution | | 100 gm. Talc | |
| V | 215 gm. Sodium Silicate Solution | 35 gm. B-Form Aluminum Trimetaphosphate | 200 gm. Talc | 9.7 |
| | 360.8 gm. Potassium Silicate Solution | | | |

From Examples I and II it can be appreciated that the thermal expansion coefficient of an inorganic silicate cement may be substantially varied from the thermal expansion coefficient of the basic cement matrix, i.e., the thermal expansion coefficient which would result absent the inclusion of selected filler materials, in accordance with the practice of the present invention. While the direct measurement of the thermal expansion coefficient of the filler-less cement matrix may prove difficult due to a lack of structural integrity, the thermal expansion coefficient thereof may be indirectly determined, either by the formation of a silicate cement having a filler material therein which does not influence the thermal expansion coefficient but which provides sufficient structural integrity to allow for direct measurement, or alternatively by mathematical extrapolation from several measured values of cement compositions having varying proportions of expansion-influencing filler materials. With respect to the cement matrix of Examples I and II, mathematical calculations yielded an estimated thermal expansion coefficient of about $13 \times 10^{-6}$ °C.$^{-1}$. Thus, it can be seen that the use of manganese powder substantially increased the thermal expansion coefficient and the use of fused silica substantially decreased the thermal expansion coefficient of the silicate cement. Of course, it will be appreciated that the cement compositions disclosed in the Examples do not represent the extremes of values of thermal expansion coefficient which may be attained by the practice of the present invention, but rather are intended to be only illustrative of the inventive concept. It is expected that the inclusion of amounts of metallic powder in excess of the amounts in Example I will yield silicate cement compositions having thermal expansion coefficients greater than $20 \times 10^{-6}$ °C.$^{-1}$, and perhaps as high as about $25 \times 10^{-6}$ °C.$^{-1}$. Likewise, it is expected that the inclusion of greater proportions of fused silica than used in Example II will yield silicate cement compositions having thermal expansion coefficients as low as about $4.0 \times 10^{-6}$ °C.$^{-1}$.

The effect of the inclusion of fused silica as a filler material is more fully illustrated in Examples III-V, where calculations indicated that the thermal expansion coefficient of the basic cement matrix without fillers is about $13 \times 10^{-6}$ °C.$^{-1}$, and where a decreasing proportion of fused silica produced an increasing thermal expansion coefficient in the final silicate cement composition. Of course, the scope of the invention is not intended to be limited by the illustrative Examples discussed specifically herein, but rather, by the claims which follow.

I claim:

1. In an organic silicate cement composition including a water soluble silicate and an inorganic curing agent which combine and cure to form a cement having a coefficient of thermal expansion, the improvement comprising:
an inorganic filler material of fused silica in an amount to provide a selected coefficient of thermal expansion in the cured inorganic silicate cement composition which is less than said coefficient of thermal expansion of said cement matrix,
wherein the cured inorganic cement composition comprises by weight about 5 to 70 percent silicate, about 1 to 15 percent curing agent, and about 20 to 90 percent fused silica.

2. In an inorganic silicate cement composition including a water soluble and an inorganic curing agent which combine and cure to form a cement matrix having a coefficient of thermal expansion, the improvement comprising:

an inorganic filler material of a metallic powder in an amount to provide a selected coefficient of thermal expansion in the cured inorganic silicate cement composition which is greater than said coefficient of thermal expansion of said cement matrix, wherein the cured inorganic cement composition comprises by weight about 5 to 70 percent silicate, about 1 to 15 percent curing agent, and about 20 to 90 percent inorganic filler.

3. The composition as set forth in claim 1 or 2 wherein said silicate is a mixed alkali silicate.

4. The composition as set forth in claim 3 wherein said curing agent is a phosphate curing agent.

5. The composition as set forth in claim 4 wherein said phosphate curing agent is the B-form of aluminum trimetaphosphate.

6. The composition as set forth in claim 5 wherein said mixed alkali silicate includes potassium silicate and sodium silicate.

7. The composition as set forth in claim 2 further comprising a filler material selected from the group consisting of talc, mica and quartz in an amount equal to at least about 5 percent by weight of said cured inorganic silicate cement composition.

8. The composition as set forth in claim 7 wherein said metallic powder filler material comprises manganese powder.

9. The composition as set forth in claim 7 wherein said metallic powder filler material comprises stainless steel powder.

10. The composition as set forth in claim 7 wherein said metallic powder filler material comprises copper powder.

11. The composition as set forth in claim 4 wherein the weight ratio of said silicate to said curing agent is between about 4.0 to about 7.0.

12. The composition as set forth in claim 8 wherein said composition has a thermal expansion coefficient when cured greater than about $10 \times 10^{-6}$ °C.$^{-1}$ between about 25° C. and about 250° C.

13. The composition as set forth in claim 6 wherein said potassium silicate has a $SiO_2/K_2O$ weight ratio between about 1.9 and about 2.5.

14. The composition as set forth in claim 6 wherein said sodium silicate has a $SiO_2/Na_2O$ weight ratio between about 3.0 and about 4.0.

15. The composition as set forth in claim 8 wherein said manganese powder comprises at least about 50% by weight of said cement composition when cured, and wherein said cement composition when cured has a thermal expansion coefficient greater than about $15 \times 10^{-6}$ °C.$^{-1}$ between about 25° C. and about 250° C.

16. The composition as set forth in claim 6 wherein said filler material is fused silica; wherein said fused silica comprises at least about 10% by weight of said cement compositions when cured, and wherein said cement composition when cured has a thermal expansion coefficient less than about $8 \times 10^{-6}$ °C.$^{-1}$ between about 25° C. and about 250° C.

* * * * *

UNITED STATES PATENT AND TRADEMARK OFFICE
CERTIFICATE OF CORRECTION

PATENT NO. : 4,412,863

DATED : November 1, 1983

INVENTOR(S) : James E. Neely, Jr.

It is certified that error appears in the above-identified patent and that said Letters Patent is hereby corrected as shown below:

Column 8, line 52, "organic" should be --inorganic--.

Column 8, line 54, --matrix-- should be inserted after "cement".

Column 8, line 67, --silicate-- should be inserted after "soluble".

Column 10, line 28, "10%" should be --20%--.

Signed and Sealed this

Tenth Day of January 1984

[SEAL]

Attest:

GERALD J. MOSSINGHOFF

Attesting Officer

Commissioner of Patents and Trademarks